United States Patent [19]

Dobric

[11] Patent Number: 5,018,239
[45] Date of Patent: May 28, 1991

[54] MOWER ATTACHMENT

[76] Inventor: Milan Dobric, 92 Chandler Road, Noble Park, 3174, Victoria, Australia

[21] Appl. No.: 526,760

[22] Filed: May 22, 1990

[30] Foreign Application Priority Data

May 26, 1989 [AU] Australia ............................ PJ4373
Oct. 20, 1989 [AU] Australia ............................ PJ6940

[51] Int. Cl.⁵ ............................................ A47L 9/00
[52] U.S. Cl. ...................................... 15/328; 15/338
[58] Field of Search ................................ 15/328, 338

[56] References Cited

U.S. PATENT DOCUMENTS

| 2,930,068 | 3/1960 | Evanson et al. | 15/412 X |
| 3,142,913 | 8/1964 | Jacob | 15/328 X |
| 3,286,376 | 11/1966 | Wildes | 15/338 X |
| 3,373,514 | 3/1968 | Forren | 15/328 X |
| 3,676,893 | 7/1972 | Smythe | 15/338 X |
| 3,871,052 | 3/1975 | Luckcuck | 15/328 |
| 3,918,119 | 11/1975 | Sweet | 15/328 |
| 3,940,827 | 3/1976 | Greco | 15/338 X |
| 4,008,505 | 2/1977 | Clowers | 15/338 |
| 4,422,211 | 12/1983 | Chernosky | 15/338 X |

Primary Examiner—Chris K. Moore
Attorney, Agent, or Firm—Sughrue, Mion, Zinn, Macpeak & Seas

[57] ABSTRACT

The mower attachment includes a wheeled platform having a platform upon which a conventional power lawn mower is adapted to be mounted with the wheels of the power mower spaced from the ground. An upstanding peripheral rim is provided on the platform to inhibit lateral movement of the mower when mounted on the platform. The center portion of the platform is provided with an opening adapted to be located below the rotatable blade of the mower and is in communication with a leading head portion having an intake opening whereby suction created by the rotating mower blade causes loose debris on the ground to be drawn through the intake opening to the opening in the bottom of the platform.

8 Claims, 2 Drawing Sheets

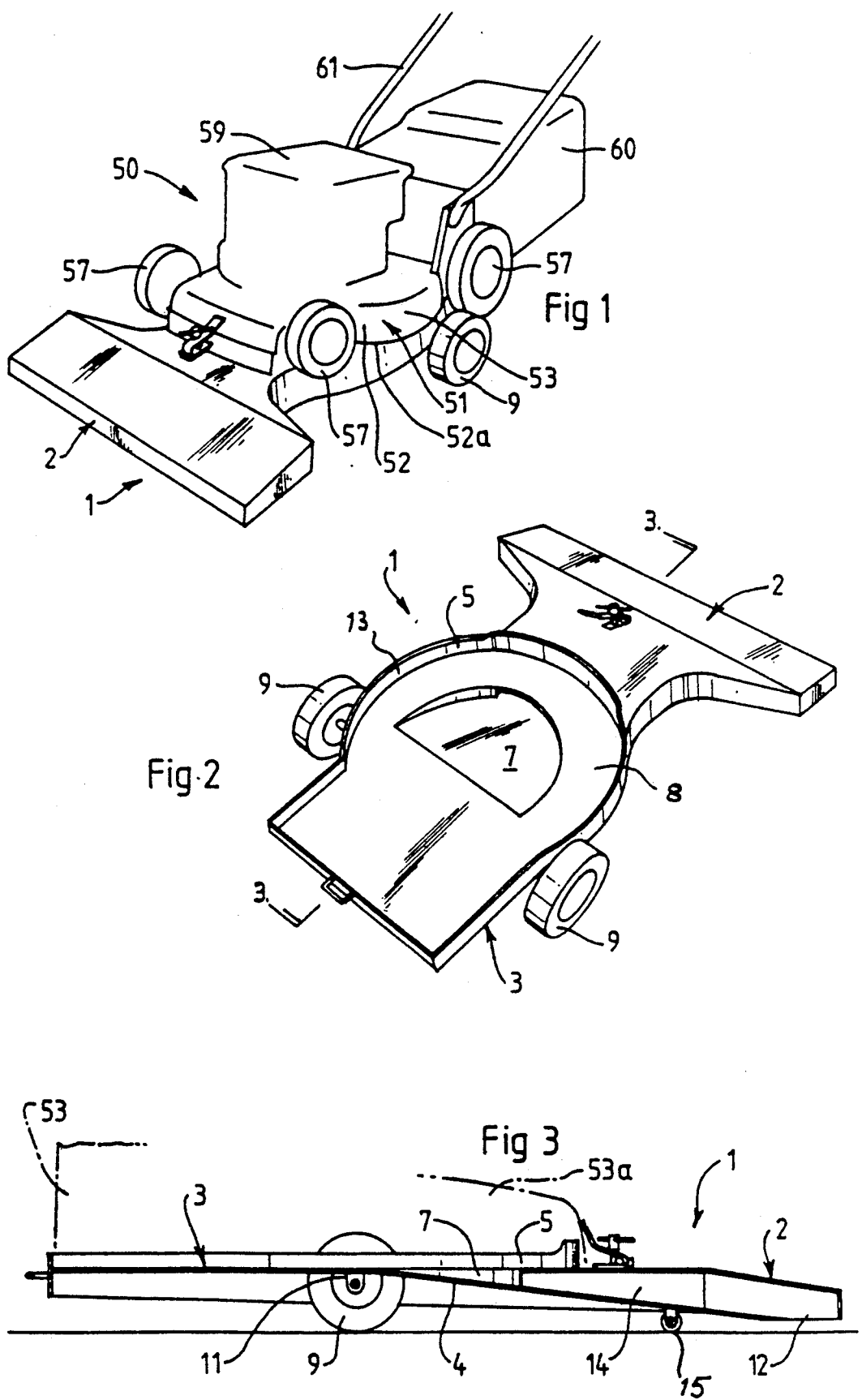

MOWER ATTACHMENT

BACKGROUND OF THE INVENTION

This invention relates generally to an attachment which is suitable for use with mowers for mowing lawns or the like and more particularly rotary type lawn mowers.

SUMMARY OF THE INVENTION

It is in some instances desirable that loose debris such as leaves, twigs and the like, which can accumulate on lawns, driveways, pavements and the like be removed. Removal is generally carried out by hand held rakes. The main disadvantage of this procedure is that it is relatively time consuming. Machines have been proposed which can be used for removing such debris however, such machines are generally costly and the expense of the machine cannot be justified.

To alleviate the problems referred to above, apparatus have been proposed which are attachable to lawn mowers which convert the mower into a vacuum cleaner. Such apparatus generally utilize the suction effect created by the mower blades. Known devices of this type are described in U.S. Pat. Nos. 3,871,052 and 4,306,331. U.S. Pat. No. 4,306,331 describes a device which bolted to the underside of the lawnmower so as to be suspended therefrom. U.S. Pat. No. 4,306,331 describes a device which comprises a baffle plate having an intake opening therein the baffle plate being attached to the underside of the mower. In most of the embodiments described, the intake opening is disposed directly below the mower and is fitted With a flap to assist in drawing air through the intake opening. In the embodiment shown in FIG. 63, a set of wheels are positioned in the region of the flap for maintaining it at a desired distance above the surface being cleaned.

A major drawback with the devices described in the aforementioned patent specifications is that because of the manner of mounting of the device to the lawnmower. That is because the devices are suspended from the mower significant problems are associated with the mounting and dismounting of the device to or from the mower. Mounting of the device to the mower can be relatively difficult and time consuming. A further problem of the majority of the devices shown is that they are relatively complicated in structure or the intake opening is disposed below the mower body. This latter feature causes difficulties for the operator in ensuring material passes into the intake opening.

It is an object of the present invention to provide an improved apparatus which is suitable for use with a mower which can remove debris from lawns and like surfaces and alleviates one or more of the aforementioned problems.

One form of mower with which the apparatus of the invention is suitable for use, is adapted to travel over ground or surface having material to be removed thereon and comprises a housing, a motor driven blade assembly mounted to the housing so as to be disposed adjacent the ground or surface when the mower is in use, the blade assembly being adapted for rotation relative to the main body about an axis Which is generally at right angles with respect to the ground or surface.

The housing of the mower may include a blade mounting section having a recessed portion on the underside thereof with a downwardly depending skirt at last partially surrounding the recessed portion. The blade assembly is adapted to be mounted within the recessed portion and operatively connected to a motor for causing rotation thereof. Ground engaging wheels are provided for enabling the mower to travel over the ground. The mower may further include a catcher which is preferably releasably securable to the main body section for receiving cuttings of the material being mowed.

According to the present invention there is provided an apparatus suitable for use with a mower the mower comprising a housing, a motor driven blade assembly mounted to the housing so as to be disposed adjacent the ground or surface over which the mower travels when in use, the blade assembly being adapted for rotation relative to the housing about a generally upright axis with respect to the ground or surface, the apparatus comprising a main body which includes a cover section which when the attachment is in a mounted position, is arranged so that the cover section and the housing of the mower at least partially encase the blade assembly in a compartment and a head section which is secured to or integral with the cover section and projects forwardly of the mower housing when in the mounted position, the head section having an intake opening which in use is disposed adjacent and facing the ground or surface, with a transfer passage providing communication between said intake opening and said compartment, the apparatus further including ground engaging wheels operatively connected to said main body so that when the apparatus is in the mounted position the mower is carried on said main body and supported by said ground engaging wheels the arrangement being such that rotation of the blade assembly causes loose debris on the ground to be drawn through the intake opening and into the compartment via the transfer passage.

BRIEF DESCRIPTION OF THE INVENTION

The ground engaging wheels may be mounted for rotation about a single axis thereby permitting the apparatus to pivot about that axis. The apparatus may include a single set of ground engaging wheels disposed on opposite sides of the main body of the apparatus for rotation about that axis. Preferably the ground engaging wheels are disposed towards the rear of the main body of the apparatus.

A ground engaging guide may be provided adjacent the head section of the main body for supporting the intake opening at a selected distance from the ground. The guide may comprise a roller mounted on an underside of said main body adjacent said intake opening.

In one form the main body may comprise a side wall which includes a support surface or platform section for receiving a portion of the mower housing when in the mounted position and an upstanding peripheral rim. The rim is adapted to inhibit lateral movement of the mower to the apparatus when in the mounted position.

DETAILED DESCRIPTION OF THE INVENTION

The material collected in the compartment may be caused to be passed into a catcher attached to the mower via discharge outlet, providing communication between the compartment and the catcher.

In one form the cover section may comprise a base wall having a recessed section which in part forms the compartment. The recessed section may communicate with opening in the head section via the transfer passage.

Fastening means may be provided for releasably securing the main body to the mower. The releasable fastening means may comprise a clamping tongue having a free end portion the other end portion being adapted to pivot, the free end portion being adapted to overlie a section of the mower housing so as to hold it captive between the tongue and main body the fastening means further including tightening means for tightening the tongue into a clamping position.

The head section of the main body may comprise an elongated member which is formed integral with the closure section, said elongated member including an elongated inlet opening on its underside, the longitudinal axis of the elongated member extending generally transversely with respect to the normal direction of travel of the mower.

Preferred embodiments of the invention will hereinafter be described with reference to the accompanying drawings in which:

FIG. 1 is a schematic perspective view of a lawn mower with apparatus according to the present invention in the mounted position;

FIG. 2 is a perspective view of apparatus according to the present invention;

FIG. 3 is a sectional side elevation of the apparatus shown in FIG. 2;

Figure 4:
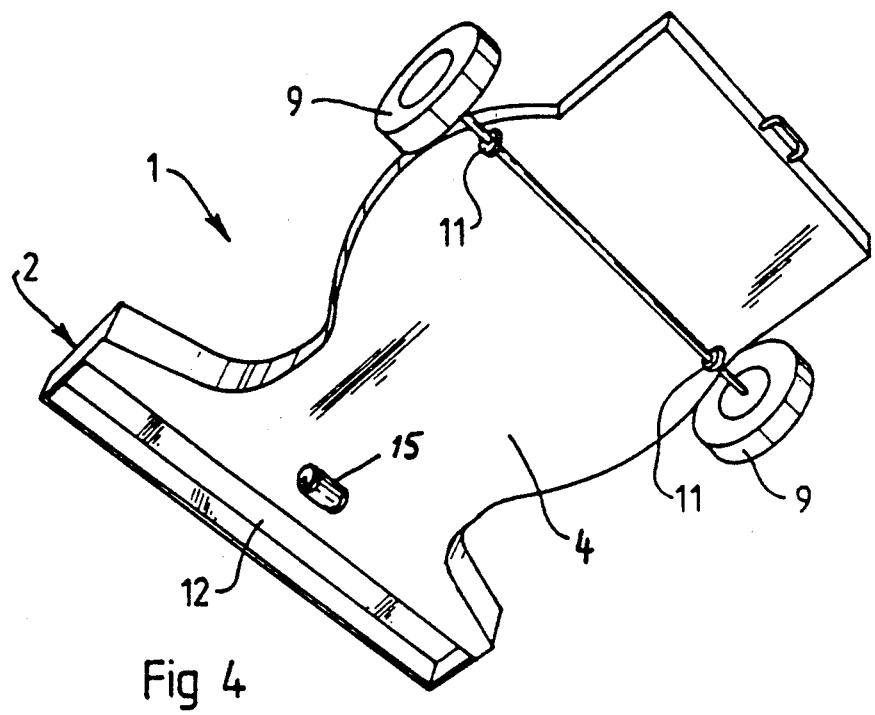
FIG. 4 is an underside perspective view of the apparatus shown in FIGS. 2 and 3.
Figure 5:
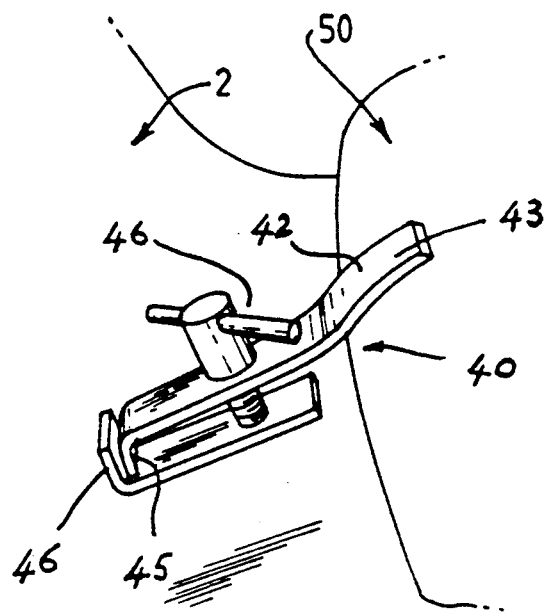
FIG. 5 is a detail of releasable fastening means which forms part of the apparatus.

Referring to the drawings, there is shown a mower generally indicated at 50 having a housing 51 with a blade assembly section 53 for receiving a blade assembly (not shown), the blade assembly being mounted for rotation about a generally vertical axis. The blade assembly section 53 includes a recessed portion 53a with a downwardly depending skirt 52 having a free edge 52a. Ground engaging wheels 57 are provided which support the mower and enable it to travel over the ground. A motor 59 is provided on the top of the blade assembly housing 53 for rotating the blade assembly and a catcher 60 is provided at the rear of the blade assembly housing for receiving cuttings. A handle 61 is provided for use by the operator.

The apparatus generally indicated at 1 comprises a main body having a closure section 3 and a head section 2. The closure section and head section in the form shown comprises a one piece structure although it will be appreciated that they could be separate integers operatively connectible to one another. The closure section 3 includes a base wall 4 and a side wall 5 the side wall including a support surface or platform 8 and an upstanding rim 13. The closure section 3 includes a chamber 7 which in part is defined by a downwardly sloping portion of base wall 4 which also forms part of a transfer passage 14. If desired, sealing elements which may be in the form of rubber strips may be provided at least partially around the side wall.

The head section 2 is disposed forwardly of the closure section 3 and comprises an elongated member having an elongated intake opening 12 therein. The intake opening 12 is in communication with chamber 7 in the closure section 3 via the transfer passage 14.

The apparatus further includes ground engaging wheels 9 operatively connected to the main body of the apparatus and as shown the wheels are disposed towards the rear of the apparatus. A single set of wheels are provided for rotation about a single axle or aligned axles.

The apparatus further includes a guide wheel in the form shown comprises a roller 15 which is disposed on the underside of the apparatus adjacent the opening 14 in the head section 2. The purpose of this guide is not to substantially provide any support but rather to maintain a minimum distance between opening 14 and the ground. It will be appreciated that the guide could also be in the form of a shed or the like.

Fastening means 40 is provided at the forward end of the apparatus and includes a clamping tongue 42 having a free end portion 43 the other end 45 engaging a stop device 46 to enable the tongue to be pivoted about that end. A tightening device in the form of screw 44 enables the clamping tongue to grip the mower and hold it captive between the tongue and the main body of the apparatus. Additional fastening means may be provided at the rear of the apparatus. These fastening means can take any suitable form such as clips or the like.

In the mounted position the housing 53 of the mower sits on the closure section 3 of the apparatus to form a compartment defined by chamber 7 and the interior of the blade housing with the head section 2 extending forwardly. When in the mounted position, the mower is supported totally by the apparatus on ground engaging wheels 9. This provides the assembly with a high degree of maneuverability during operation and with the head section 2 extending forwardly it can readily be seen by the operator.

To mount the apparatus, the mower is simply tilted backwards on its rear wheels and the apparatus rolled into position underneath the mower. The mower is then returned to original position and as a result of this movement, will be automatically correctly positioned on the apparatus. The fastening means 40 and if required, rear fastening means are tightening or locked so that the apparatus and mower are held together. It will be appreciated that the fastening means can be relatively light and simple because they are not required to carry any load.

In many cases the debris is discharged into the existing mower catcher through the existing outlet. In certain cases an additional attachment may be provided which can take the place of the normal catcher. This attachment is adapted to have mounted thereto a bag which can be suitably supported on the mower. The attachment can be releasably secured at the outlet where the usual catcher is provided thereby enabling a large collecting bag to be substituted for the catcher.

Finally, it is to be understood that various alterations, modifications and or additions may be incorporated into the various constructions and arrangements of parts without departing from the spirit and ambit of the invention.

What is claimed is:

1. Apparatus suitable for use with a mower, the mower comprising a housing, a motor driven blade assembly mounted to the housing so as to be disposed adjacent the ground or surface over which the mower travels when in use, the blade assembly being adapted for rotation relative to the housing about a generally upright axis with respect to the ground or surface, the apparatus comprising a main body which includes a side wall which includes a support surface or platform section for receiving a portion of the mower housing when in the mounted position and an upstanding peripheral rim arranged to inhibit lateral movement of the mower when in the mounted position, a cover section which when the attachment is in a mounted position, is arranged so that the cover section and the housing of the mower at least partially encase the blade assembly in a compartment and a head section which is secured to or integral with the cover section, the head section having an intake opening which in use is disposed adjacent and facing the ground or surface, with a transfer passage providing communication between said intake opening and said compartment, the apparatus further including ground engaging wheels operatively connected to said main body so that when the apparatus is in the mounted position the mower is carried on said main body and supported by said ground engaging wheels, said ground engaging wheels are mounted for rotation about a single axis thereby permitting the apparatus to pivot about said axis, the arrangement being such that rotation of the blade assembly causes loose debris on the ground to be drawn through the intake opening and into the compartment via the transfer passage.

2. Apparatus according to claim 1 further including a ground engaging guide adjacent the head section of the main body for supporting the intake opening at a selected distance from the ground.

3. Apparatus according to claim 2 wherein said guide comprises a roller mounted on an underside of said main body adjacent said intake opening.

4. Apparatus according to claim 1 wherein material collected in the compartment is caused to be passed into a catcher attached to the mower via a discharge outlet, providing communication between the compartment and the catcher.

5. Apparatus according to claim 1 wherein said cover section comprises a base wall having a peripheral side wall section which, in use, is engageable with a free edge of a skirt of the mower housing, thereby defining the compartment between the base wall and the housing, said base wall having a recessed section which in part forms the compartment, the recessed section being adapted to at least partially receive the blade assembly therein.

6. Apparatus according to claim 1 further including fastening means for releasably securing the main body to the mower.

7. Apparatus according to claim 6 wherein said releasable fastening means comprises a clamping tongue having a free end portion the other end portion being adapted to pivot, the free end portion being adapted to overlie a section of the mower housing so as to hold it captive between the tongue and main body, the fastening means further including tightening means for tightening the tongue into a clamping position.

8. Apparatus according to claim 6 wherein said head section comprises an elongated member which is formed integral with the closure section, said elongated member including an elongated inlet opening on its underside, the longitudinal axis of the elongated member extending generally transversely with respect to the normal direction of travel of the mower.

* * * * *